United States Patent [19]

Falco

[11] 4,432,600
[45] Feb. 21, 1984

[54] METHOD AND APPARATUS FOR COUPLING AT LEAST TWO OPTICAL FIBERS BY MEANS OF A HOLOGRAPHIC LENS

[75] Inventor: Lucien Falco, Cornaux, Switzerland
[73] Assignee: Cabloptic S.A., Switzerland
[21] Appl. No.: 249,211
[22] Filed: Mar. 30, 1981
[30] Foreign Application Priority Data
Apr. 3, 1980 [CH] Switzerland .................. 2677/80
[51] Int. Cl.³ ................................. G02B 5/14
[52] U.S. Cl. .................... 350/96.18; 350/96.20
[58] Field of Search ............ 350/96.18, 96.20, 3.7, 350/3.77, 3.86, 3.69, 96.21

[56] References Cited

U.S. PATENT DOCUMENTS

| | | | |
|---|---|---|---|
| 3,666,345 | 5/1972 | Maslowski | 350/3.7 |
| 4,057,319 | 11/1977 | Ash et al. | 350/96 C |
| 4,310,216 | 1/1982 | Pellaux | 350/96.18 |

FOREIGN PATENT DOCUMENTS 54-3561  1/1979  Japan ................... 350/3.72

*Primary Examiner*—David K. Moore
*Assistant Examiner*—Robert E. Wise
*Attorney, Agent, or Firm*—Stevens, Davis, Miller & Mosher

[57] ABSTRACT

The present invention relates to a process of coupling optical fibers by means of a holographic lens, and an apparatus for carrying out this process. A holographic lens $H_2$ is recorded conventionally by utilization of a provisional hologram $H_1$, by means of two monomodal optical fibers mounted by their respective end pieces in a block used to support the holographic lens. The block has bores, clearly defined in shape and position, into which are introduced the end pieces of monomodal fibers to effect recording of the holographic lens, and in which are fixed the end pieces of multimodal fibers which are to be optically coupled after withdrawal of the monomodal fibers. The process and apparatus of the invention enables the speckling phenomenon, i.e., that of non-uniform distribution of light in the transmitted beams, to be suppressed, improving the efficiency of the holographic lens.

5 Claims, 2 Drawing Figures

METHOD AND APPARATUS FOR COUPLING AT LEAST TWO OPTICAL FIBERS BY MEANS OF A HOLOGRAPHIC LENS

BACKGROUND OF THE INVENTION

The present invention relates to a process of coupling at least two optical fibers by means of a holographic coupling lens, in which a recorded phase and volume hologram forms the holographic coupling lens.

It likewise relates to an apparatus for carrying out this process, comprising a rigid support arranged to keep the holographic coupling lens and the ends of the fibers to be coupled in given relative positions.

Coupling processes of this type, as well as apparatus for carrying them out, have already been described, in particular in U.S. Pat. No. 4,057,319 and in U.S. Pat. No. 4,310,216.

In U.S. Pat. No. 4,057,319, the ends of the fibers are respectively mounted in two complementary parts of a support, these parts being able to be assembled to constitute the support and to maintain the holographic coupling lens and the ends of the fibers to be coupled in a given relative position.

In U.S. Pat. No. 4,310,216 mentioned above, the coupling makes use of an "in situ" technique. The two fiber ends to be coupled are buried in a transparent block, within which is formed a first hologram, termed a provisional hologram, used for recording a second hologram, termed a definitive hologram, the latter of which is utilized as the coupling hologram for the two optical fibers.

In these two cases, the fibers which are coupled and utilized for the recording of the hologram of the holographic coupling lens are multimode fibers which are used in signal transmission via optical fibers. It has been observed that holographic couplers with multimode fibers provide low efficiency if the holograms are recorded by means of these fibers. This is due to a non-uniform distribution of light in the beams issuing from the fibers, a phenomenon called "speckling", which alters the interference image. The maximum efficiency is reduced by a factor of two to three according to the type of coupler.

SUMMARY OF THE INVENTION

The present invention is intended to remedy these disadvantages by providing a process for coupling optical fibers enabling the negative effects due to the speckling phenomenon to be suppressed, and by substantially increasing the efficiency of the coupler.

For this purpose, the above-mentioned process first records a phase and volume hologram by means of monomodal optical fibers, and the monomodal fibers are then replaced by multimode fibers. Means are provided for precisely positioning the ends of the multimode fibers in the location previously occupied by the monomodal fibers.

The apparatus for carrying out this process comprises means for precisely positioning the ends of the multimode fibers to be coupled in the location initially occupied by the monomodal fibers.

BRIEF DESCRIPTION OF THE DRAWINGS

The process and the apparatus according to the invention will be better understood with reference to the description of an example of an embodiment and to the attached drawing, in which.

DETAILED DESCRIPTION OF THE INVENTION

Figure 1:
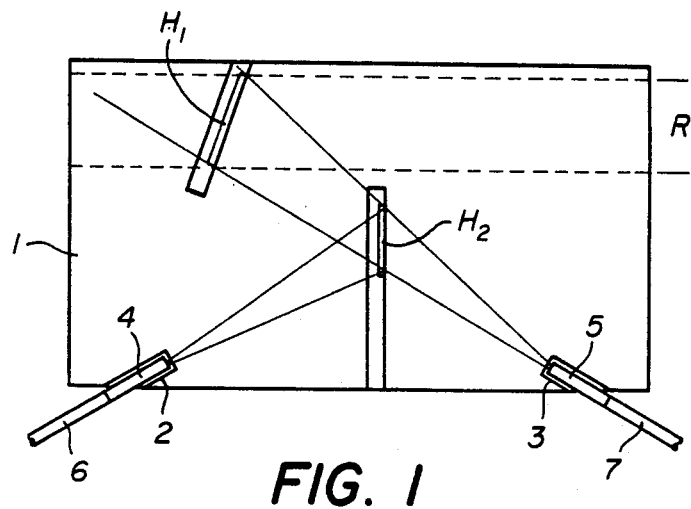
FIG. 1 shows a schematic view of a holographic coupler according to the invention.

With reference to FIG. 1, the holographic coupler shown is preferably in the form of a cylindrical block 1 of hardened, transparent synthetic material, such as a polymerized resin. Two bores 2 and 3, of cylindrical shape, are provided to accommodate the end pieces or ferrules 4 and 5, which are mounted at the ends 6 and 7 of two optical fibers intended to be coupled by means of this coupler. Within this block is located a first holographic lens called a provisional lens $H_1$, and a second holographic lens $H_2$ called a definitive lens, which is used for coupling the optical fibers 6 and 7. The Swiss patent cited in the introduction describes in detail the manner of recording the hologram $H_2$ by means of the provisional lens $H_1$.

In the process described, the fibers 6 and 7 utilized for recording the holograms $H_1$ and $H_2$ are monomodal fibers, which enable the speckling phenomenon to be eliminated and a highly efficient coupling lens to be obtained. The monomodal fibers being difficult to manufacture and costly to produce, it is hardly possible, nor profitable, to utilize them at present and in large amounts for signal transmission by optical fibers. This is why they are only utilized in the phase of formation of the coupling lens, with provision of precise mountings in the block 1 into which the end pieces or ferrules with which the monomodal fibers are equipped can be initially introduced. Thereafter, the monomodal fibers are withdrawn and multimode fibers, which are to be coupled by holographic lens $H_2$, are precisely positioned and permanently put in place by cementing their end pieces in a position previously occupied by the end pieces of the monomodal fibers.

FIG. 1 shows by way of example a particularly simple embodiment in which these mountings are constituted by bores 2 and 3 of substantially cylindrical shape. The diameter of these bores corresponds to the external diameter of the end pieces 4 and 5, and the bottom of the bore preferably has an annular shoulder against which the end piece of the fiber comes to abut, thus precisely defining its position in the axial direction of this bore.

Figure 2:
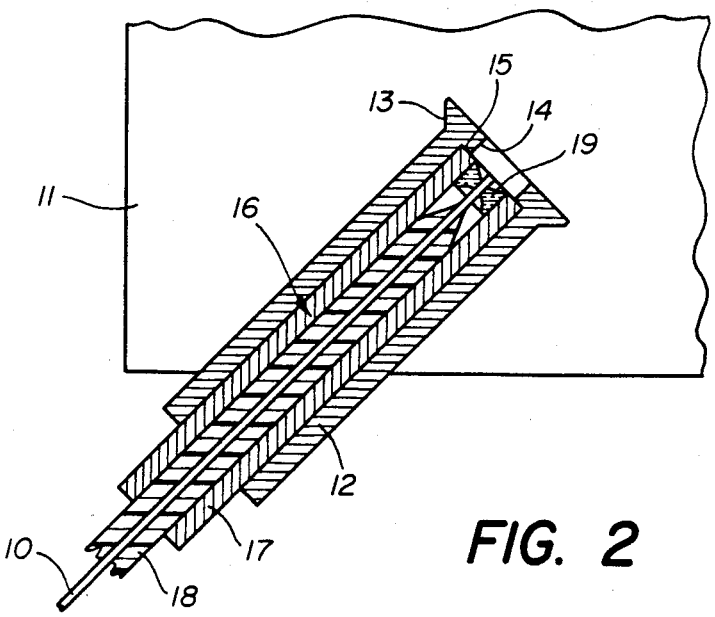
FIG. 2 shows an enlarged view of a part of the coupler of FIG. 1, more particularly illustrating the means enabling the ends of the multimode fibers to be precisely positioned after withdrawal of the monomodal fibers utilized for recording the hologram.

FIG. 2 shows a slightly more elaborate embodiment of the means intended to precisely position the ends of the optical fibers to be coupled. For each of the optical fibers 10 to be coupled, a socket, or sleeve 12, is inlaid in the transparent block 11. The socket 12, of hollow cylindrical shape, has at its end a peripheral enlargement 13 oriented towards the exterior and intended to rigidly anchor this socket in the mass of the transparent block, and an internal rim 14 defining an annular shoulder 15 against which the end piece 16 in which the end of the optical fiber 10 is mounted abuts. The end piece 16 comprises a tubular element 17, the internal diameter of which substantially corresponds to the external diameter of the sheath 18 surrounding the fiber 10, and a centering element 19, for example, a watch jewel, mounted at the coupling end of the tubular element 17.

The external diameter of this tubular element 17 substantially corresponds to the internal diameter of the socket 12, such that when the end piece of the fiber is introduced into the socket, its radial position is precisely defined. The axial position is defined by the shoulder 15, against which the end piece 16 comes to abut when it is pushed to the bottom within the socket 12.

This positioning apparatus ensures interchangeability of the fibers, and in particular enables the monomodal fibers utilized for the recording of the holographic lens to be replaced by the multimode fibers utilized later. The multimode fibers are preferably mounted permanently, for example, by cementing to the interior of the receiving socket.

Although exemplary preferred embodiments of the invention have been shown and described, many modifications can be made without departing from the spirit and scope of the invention. Accordingly, the invention is not limited by the description provided, but is only limited by the attached claims.

I claim:

1. A method of coupling at least two optical fibers by a holographic coupling lens, comprising the steps of recording a hologram of phase and volume by means of monomodal optical fibers to produce a holographic coupling lens, replacing said monomodal fibers by multimodal fibers, and providing a positioning mechanism for precisely positioning the ends of the multimodal fibers at the position previously occupied by the replaced monomodal fibers.

2. An apparatus for coupling two optical fibers comprising a rigid support arranged to hold in given relative positions monomodal fibers and a holographic coupling lens formed by said monomodal fibers, said rigid support comprising means for precisely positioning the ends of multimodal fibers to be coupled at a position initially occupied by said monomodal fibers used to form said holographic coupling lens.

3. An apparatus according to claim 2, in which said holographic lens comprises a hologram of phase and volume which is molded into a transparent block, said means for positioning first the monomodal fibers and then the multimodal fibers comprising blind bores arranged in said block so that the ends of the fibers to be coupled can be lodged in them.

4. An apparatus according to claim 3, in which said fiber ends are mounted within metallic end pieces of cylindrical shape, said blind bores being of cylindrical shape and having an internal diameter substantially equal to the external diameter of the end parts of the fibers to be coupled.

5. An apparatus according to claim 3 wherein said blind bores are formed by hollow cylindrical metallic sockets set in the mass of the transparent block, the internal diameter of said metallic sockets being substantially equal to the external diameter of the end parts of the fibers to be coupled.

* * * * *